Nov. 5, 1940.  R. B. COTTRELL  2,220,218
SPRING PLANKLESS TRUCK
Filed March 15, 1938   4 Sheets-Sheet 2
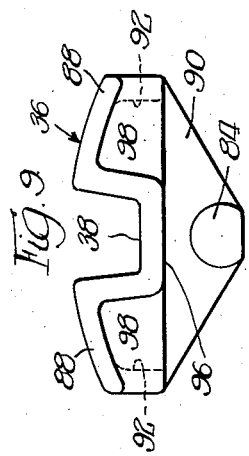
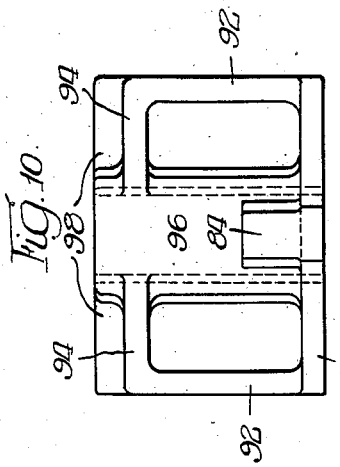
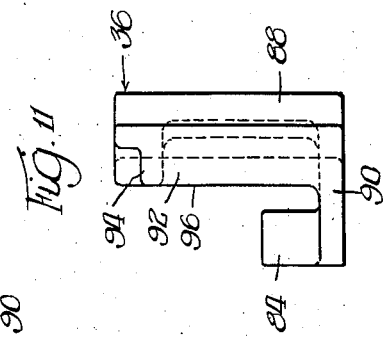
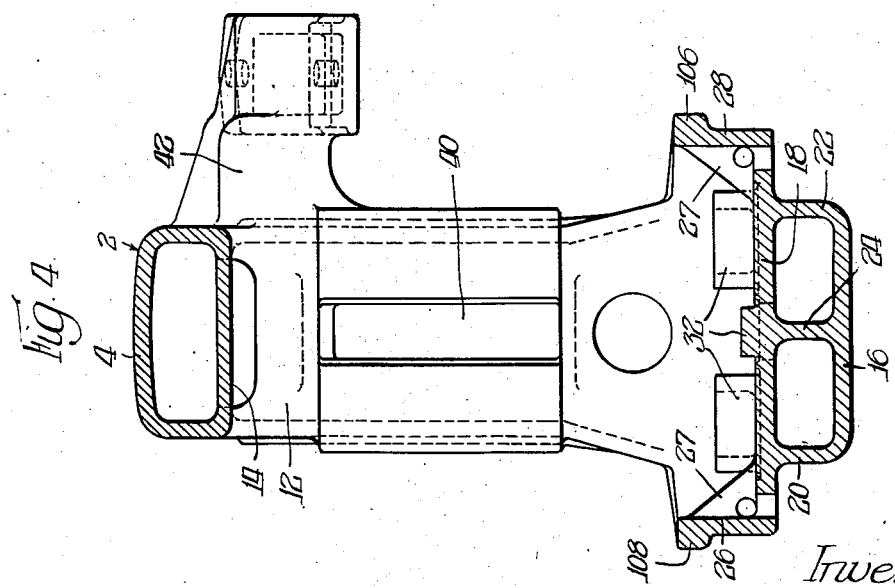
Inventor:
Robert B. Cottrell,
By [signature]
atty.

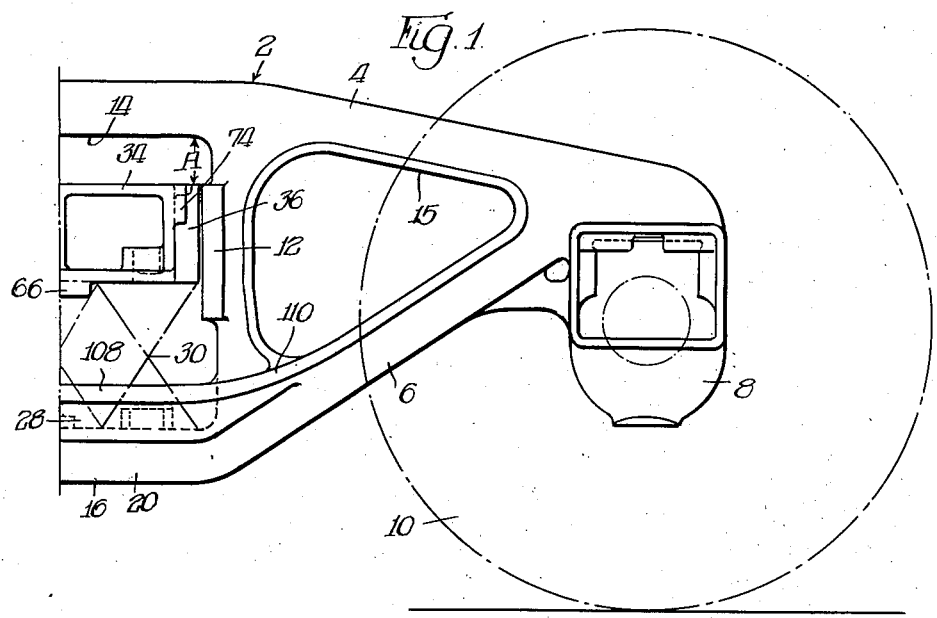
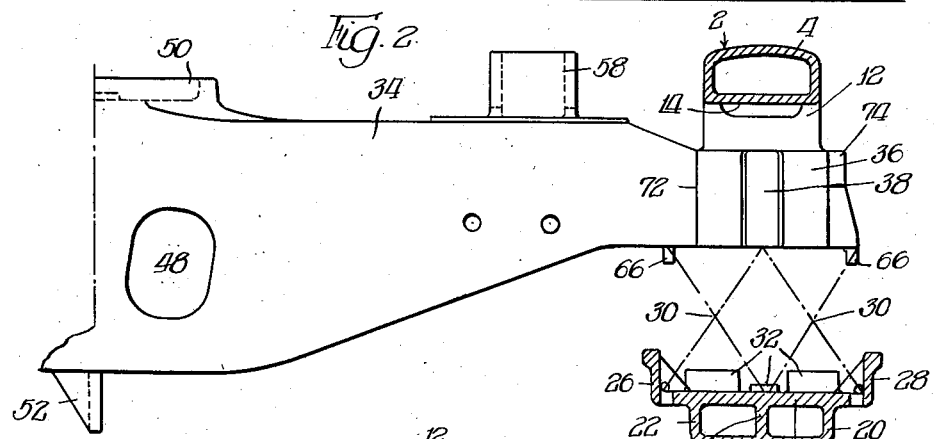
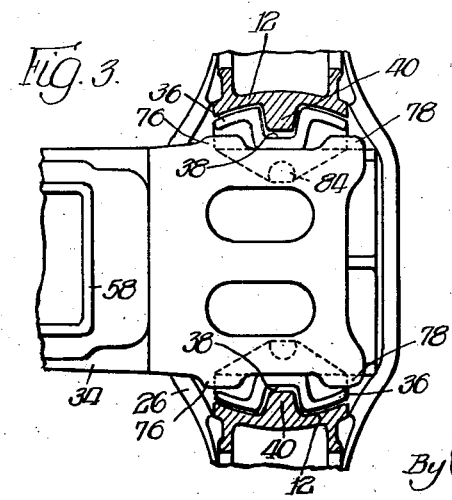

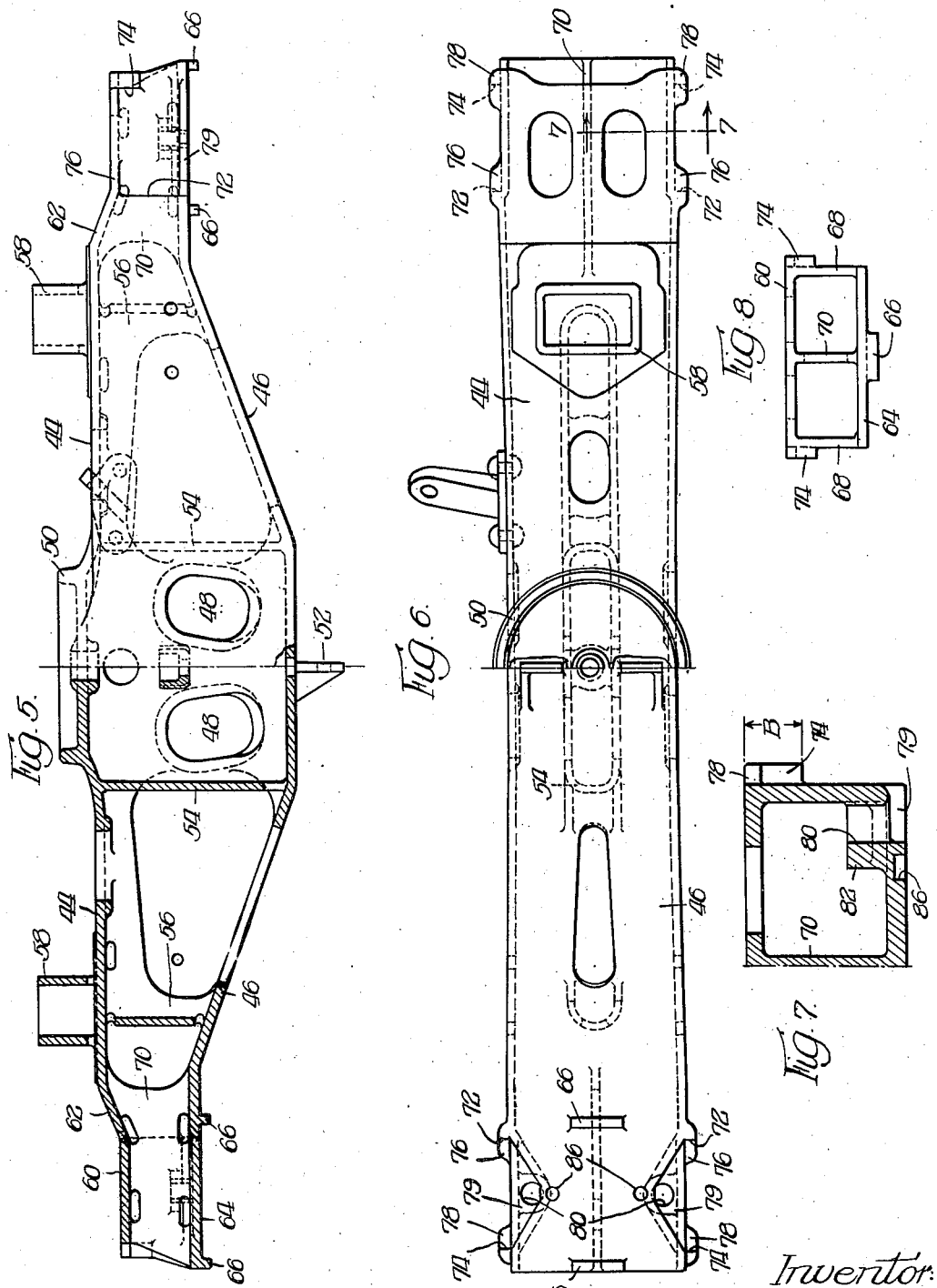

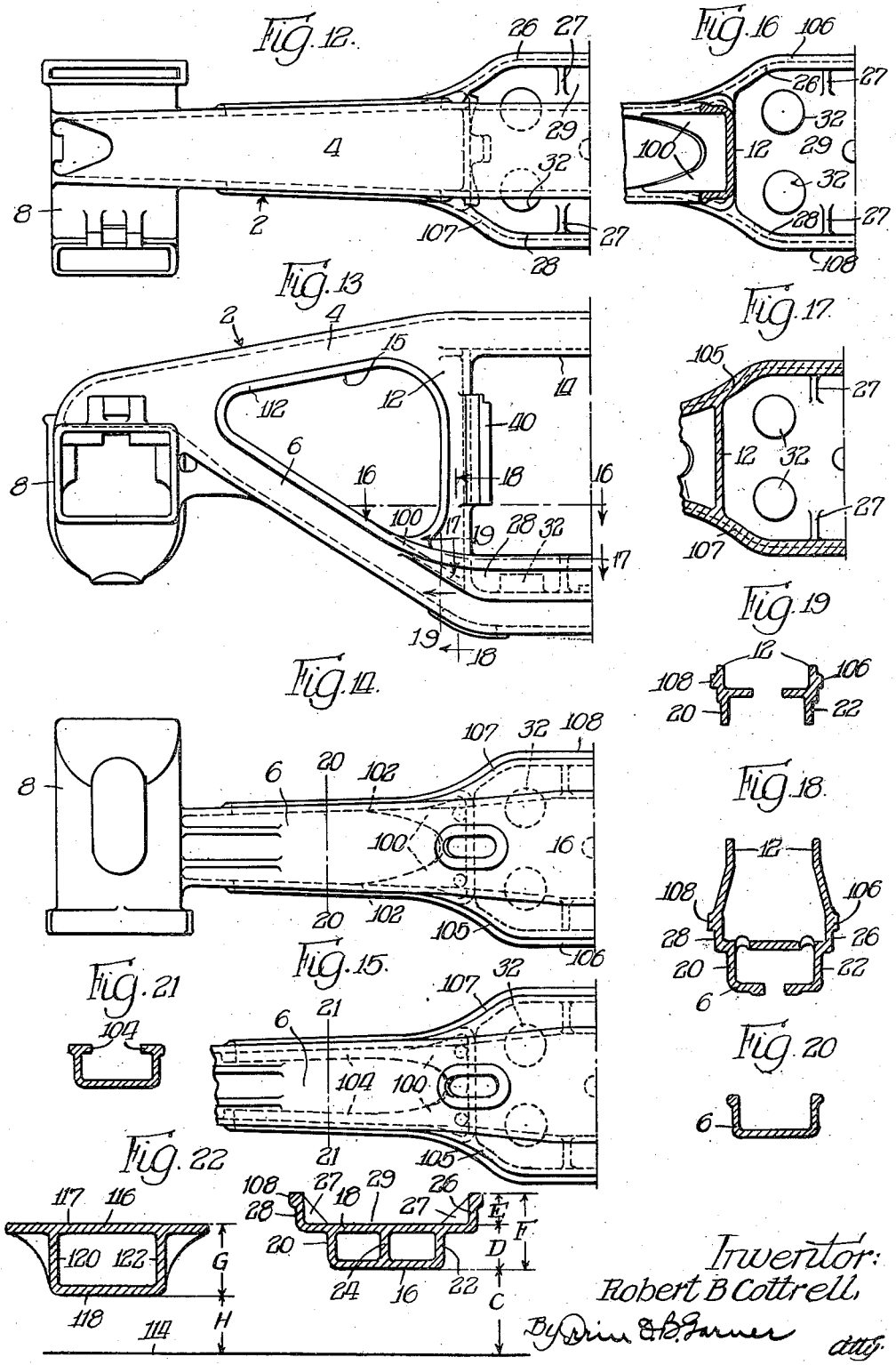

Patented Nov. 5, 1940

2,220,218

UNITED STATES PATENT OFFICE 2,220,218

SPRING PLANKLESS TRUCK

Robert B. Cottrell, Chicago, Ill., assignor to American Steel Foundries, Chicago, Ill., a corporation of New Jersey Application March 15, 1938, Serial No. 196,035

18 Claims. (Cl. 105—197.2)

My invention relates to four wheel railway trucks and more particularly to what is commonly known as a spring plankless type of such truck wherein the bolster cooperates with the side frame in such manner as to obviate the necessity of a spring plank.

The general object of my invention is to devise such a four wheel truck of a quick wheel change type; in other words, a four wheel spring plankless truck wherein it will be possible to separate the bolster ends from the side frame and change wheels with great facility.

A more particular object of my invention is to devise a quick wheel change spring plankless truck wherein novel means will be availed of to connect the side frames and bolster.

A further object is to devise a self-aligning spring plankless truck wherein the connection between the side frame and bolster will be in the form of separate members, said parts being so arranged as to permit the removal of the bolster without disturbing said members or the springs on which they are seated.

My invention also comprehends a truck as that above described wherein the separate members are so designed and interlocked with the bolster and side frame as to prevent the loss of parts thereof in case of breakage.

An additional object is to design a quick wheel change type of spring plankless four wheel truck wherein the rail clearance is substantially increased and the tension member of the side frame is of special form to permit such increased clearance having a spring seat with up-turned reinforcing flanges, serving to enclose and secure the spring elements without the usual spring cap, and incorporating a box section under the spring seat.

A still further object of my invention is to design a novel truss type side frame which will permit a shallower truss, that is, less over-all height of the frame, while at the same time meeting all the test requirements. The vertical clearance thus made available may be used to increase the rail clearance or to provide greater clearance at the top of the frame depending upon the particular conditions required to be met. I have accomplished this by a novel arrangement of the spring seat portion of the truss side frame and various modifications of detail at the junctures of the struts of the side frame with the tension member and the spring seat portion thereof.

My invention also contemplates a novel form of bolster and side frame as will be apparent from the detailed description which follows.

Figure 1 is a side elevation of a car truck embodying my invention, only one-half of the truck being shown inasmuch as the opposite ends are alike.

Figure 2 is an end view of the truck structure shown in Figure 1, showing a side elevation of the bolster and a sectional view through the side frame, the section being taken substantially in the vertical plane bisecting the truck transversely. In this view, likewise, only one-half of the truck is shown.

Figure 3 is a fragmentary top plan view showing the relationship of the parts where the bolster and side frame are interlocked, the view being partly in section and the section being taken in the horizontal plane through the guide rib portion of the side frame adjacent the central part thereof.

Figure 4 is a view in section of the side frame, the section being taken substantially in the vertical plane bisecting the side frame transversely and showing in elevation the column guide portion of the side frame structure.

Figure 5 is a side elevation of the bolster structure, half in section, the section being taken substantially in the vertical plane bisecting the bolster longitudinally.

Figure 6 is a plan view of the bolster, the right half thereof showing the top plan and the left half the bottom plan.

Figure 7 is a sectional view through the bolster end, the section being taken transversely of the bolster and in the vertical plane substantially as indicated by the line 7—7 of Figure 6.

Figure 8 is an end elevation of the bolster.

Figure 9 is a top plan view of the bolster and side frame interlocking member or insert; Figure 10 is an elevational view of the inner face thereof; and Figure 11 is a side elevation thereof.

Figure 12 is a top plan view of one-half of the side frame structure, Figure 13 is a side elevation thereof, Figure 14 is a bottom plan view, and Figure 15 is a fragmentary bottom plan view showing a modified form of tension member.

Figure 16 is a horizontal section through the side frame structure shown in Figures 12 and 13, the section being taken substantially in the horizontal plane indicated by the line 16—16 of Figure 13.

Figure 17 is a sectional view taken in a substantially horizontal plane as indicated by the line 17—17 of Figure 13.

Figures 18 and 19 are vertical sections through the side frame structure shown in Figures 12 and 13, the sections being taken in the vertical planes indicated respectively by the lines 18—18 and 19—19 of Figure 13.

Figure 20 is a section through the tension member of the side frame shown in Figures 12, 13 and 14, the section being normal to the axis of the member and substantially in the plane indicated by the line 20—20 of Figure 14, and Figure 21 is a corresponding sectional view through the modified form of tension member shown in Figure 15, the section being taken substantially in the vertical plane indicated by the line 21—21 of Figure 15.

Figure 22 shows the relative height above the rail of two side frames having the same capacity, one of which is of the conventional truss type and the other of which incorporates the features of my invention wherein the truss is made shallower.

Describing my novel truck structure in more detail, it may be observed that the side frame 2 is of truss type having the compression member 4 and the tension member 6 merging adjacent its ends with the integrally formed journal box 8 forming the usual means of connection with the journal portion of the wheel and axle assembly 10. The side frame has the integrally formed spaced columns 12, 12 merging with the tension and compression members to form the bolster opening 14 and the spaced window openings 15, 15. Below said window opening the tension member is of box-like section, having the lower chord 16 and the upper chord 18 (Figure 22), the outer side wall 20 and the inner side wall 22 as well as the central reinforcing rib 24, said upper chord 18 being laterally widened and provided with the upstanding inner flange 26 and outer flange 28 reinforced by the vertical ribs 27, 27 and thus defining a pocket-like spring seat 29 within which may be seated the usual resilient means diagrammatically indicated at 30, positioning means 32, 32 for said springs being integrally formed on the spring seat portion of the tension member as required. The bolster or load carrying member 34 forms the means of tying the side frames together and holding them in proper relationship and the end thereof extends into the bolster opening 14 and is seated on the resilient means 30, the connection between the bolster end and the side frame columns being provided by the interlocking member or insert 36, said member having on its outer face the vertically arranged channel 38 cooperating with the vertical flange 40 of complementary form centrally located on the inner face of the side frame column as best seen in Figure 3. The member 36 is also interlocked with the bolster in a manner more particularly described hereafter.

Figure 4 shows an elevational view of the inner face of the side frame column 12, said view best showing the location of the vertical guide flange 40. In this view may also be observed the brake hanger bracket 42 on the inner face of the side frame adjacent the column in the usual position. It may be noted that in this modification the top of said flange terminates some distance below the compression member, thus providing additional clearance for the bolster removing or assembling operation. It will be understood, however, that the guide flange 40 may be extended upwardly to the juncture of the column 12 with the compression member 4 if it is thus desired to strengthen said juncture inasmuch as the space between the flanges 40 on the respective columns 12, 12 at opposite ends of the frame is greater than the over-all width of the bolster including the flanges 74 hereafter described. It may be further noted that the above mentioned interlocking members or inserts 36 when seated in their operative positions on the spring group 30 have a height equal to the depth of the bolster end and that the distance between the tops of these inserts and the overlying portion of the compression member 4 at the top of the bolster opening 14 is equal to a distance A sufficient to permit the removal of the bolster end when raised to its topmost position.

Figures 12 to 21 inclusive show in detail the structure of my novel truss type side frame, the various views and sections of which clearly show the novel features of design and construction. The excellent test results secured from this particular design of truss arrangement appear to be due principally to the construction of the spring seat portion of the tension member and the method in which it is joined with other portions of the tension member and with the struts or columns 12. The use of the before-mentioned upstanding inner and outer flanges 26 and 28 enable me to reduce substantially the depth of the tension member box section under the spring seat 29, thus providing the much desired additional rail clearance. The shallower truss structure is also facilitated by the manner in which the various parts of the spring seat and the diagonal portion of the tension member merge with the bottom of the strut or column 12. The top web 18 (Figure 4) of the tension member is extended through the columns 12 as at 100 and in the modification shown in Figure 14 the portions thereof die out or merge with the side walls of the tension member as at 102, 102 while in the modification shown in Figure 15 these divided portions are continued to form the reentrant flanges at 104, 104 (Figure 21). The method used in merging the vertical upstanding flanges 26 and 28 into the side walls of the column 12 and the diagonal portion of the tension member is best shown in Figures 16, 17 and 18 wherein it may be seen that the side walls of the column diverge near their lower ends (Figure 18) to meet the converging portions 105 and 107 (Figure 17) of the flanges 26 and 28. Moreover, the beads 106 and 108 along the top edges of the upturned spring seat flanges 26 and 28 respectively have been arranged to merge and be continuous with the bead 112 around the window opening 15 as best seen at 110 (Figure 1) and as also shown in the sectional views of Figures 18 and 19. The extension of the various portions of the spring seat, including the chord 29 and the lateral upstanding flanges 26 and 28 as well as the beaded edges 106 and 108, is smoothly tied up with the parts of the diagonal portion of the tension member and with the several walls of the column 12 as well as with the bead 112 extending around the periphery of the window opening 15.

By the construction shown the load normally imposed upon the spring seat 29 through the resilient means 30 superposed thereon is transferred to the diagonal tension members, the columns and the compression member smoothly and without any localization of stresses, thus permitting maximum efficiency of the metal when so disposed and making possible a lighter weight side frame as well as a shallower truss structure than would be possible otherwise.

Figure 22 shows the relative position, above the rail top 114, of the spring seat portion of a conventional type of side frame wherein the top chord 116 defines the spring seat 117, and the bottom chord 118 together with the side walls at 120 and 122 form the usual box section. It may be observed that the depth of the box section as indicated at G is substantially greater than the depth of the box section of my novel side frame as indicated at D, thus affording additional clearance above the top of the rail for my improved side frame as indicated at C in comparison with the lesser clearance indicated at H for the conventional type of side frame. At the same time the height of the spring seat 29 of my novel side frame is at the same elevation above the rail as indicated at C plus D as is the spring seat 117 of the conventional side frame as indicated at G plus H. Also, the total depth of the spring seat portion of the side frame of my novel truck as indicated at F is equal to or greater than the total corresponding depth of the conventional frame as indicated at G. The additional section modulus required in my novel form of side frame is provided in the flanges 26 and 28 upstanding a distance above the spring seat level as indicated at E. The elevation of this spring seat portion of my novel side frame is made possible, however, not only by the use of the upstanding flanges 26 and 28 but by the coordinated arrangement of the parts at the juncture of the column 12 with the diagonal portion of the tension member 6 and the spring seat portion thereof as above described.

The detail of the bolster is shown in Figures 5 to 8 inclusive, the central portion of which is of well known box structure having the top chord 44 in a generally horizontal plane and the bottom chord 46 sloping upwardly from the generally rectangular central portion in the side walls of which are formed the openings 48 providing clearance for the passage of brake rods in the well known manner. The central portion has the usual center bearing 50 forming a connection for the center bearing of the car body supported thereon. From the bottom wall of the central portion of the bolster extends the flange 52 forming a means of connection for a bar or strap designed to underlie the brake beams and provide safety means therefor. Internally the bolster has a centerpost structure indicated at 54 and internal ribbing reinforces the tapering portions of the bolster and joins the top and bottom chords thereof as indicated at 56, 56 directly under the side bearings 58, 58. The bolster end is of novel form having the top wall 60 merging with the top chord 44 of the central portion of the bolster along the diagonally arranged portion 62, also the bottom wall 64 parallel with the top wall 60 and forming seating means for the resilient means supporting the bolster, the lugs 66, 66 providing positioning means for the usual shims. Joining the top and bottom walls of the bolster end are the side walls 68, 68 and the vertical center rib 70. On the opposite side walls of the bolster and adjacent the juncture of the tapering portion 62 with the bolster end are formed the shoulders 72, 72 providing abutment for the interlocking inserts 36, 36 and adjacent the extreme end of the bolster at the top portion thereof opposite the shoulders 72, 72 are also formed the vertical shoulders 74, 74 providing abutment for the opposite sides of said inserts. Laterally extending from the top wall of the bolster end adjacent the shoulders 72, 72 are the horizontal flanges 76, 76 and similar horizontal flanges 78, 78 are formed adjacent the shoulders 74, 74, said horizontal flanges being confining means or abutments for the upper ends of the interlocking inserts insuring against loss of the parts in case an upper portion thereof should be broken away from a lower portion. On the bottom surface of the bolster end are formed the relieved or recessed V-shaped shallow pockets 79 providing seats for the base portions or horizontal flanges of said interlocking inserts, and adjacent the apex of each V-shaped pocket is provided a vertical opening 80 defined by the upstanding flange 82 (Figure 7), said opening forming a receptacle for the positioning stud 84 on the interlocking insert, said stud forming means of interlocking the insert with the bolster end and supplementing other retaining means already mentioned. On the bottom of the bolster end are also formed the recesses 86, 86 serving as positioning means for the spring plates.

The form of the interlocking member or insert 36 is shown in detail in Figures 9 to 11 inclusive wherein it may be observed that it comprises an integrally formed piece having the outer walls 88, 88 of generally cylindrical form with the previously mentioned centrally located vertical slot or channel 38, said surfaces 88 and said channel 38 being complementary in form to the surfaces on the side frame columns against which they abut as most clearly seen in Figure 3. The base 90 of the insert is complementary in form to the previously described shallow socket or seat 79 on the bottom of the bolster end and of V-shaped form with the apex of said V directed inwardly of said bolster and having at its innermost point the before-mentioned securing stud 84 designed to be received within the pocket 80 on the bottom of the bolster. Vertical reinforcing flanges 92, 92 are formed on the inner faces at the lateral edges of the insert, said flanges merging at their lower ends with the base 90 and at their upper ends with the horizontal reinforcing flanges 94, 94, the inner edges of all of said flanges lying in a single plane defined by the surface 96 formed by the inner wall of the channel 38, all of said surfaces thus providing abutment against the side of the bolster. It may be noted that the horizontal flanges 94 are located a short distance below the top of the interlocking insert structure, said distance being equal to the thickness of the flanges 76 and 78 on the upper edges of the bolster, said bolster flanges thus fitting snugly into the relieved portions at the top of the interlocking member 36 indicated at 98, 98.

To those skilled in the art it will be apparent that the method of assembly is to position the spring group upon the spring seat on the tension member of the side frame and set the inserts 36 thereupon against the guide columns at the opposite sides of the bolster opening 14 after which one end of the side frame may be mounted upon the wheel and axle assembly at one end of the truck and thereafter slipped upon the journal portion of the wheel and axle assembly at the opposite end of the truck, in the meantime raising the end of the bolster 34 until the top thereof is adjacent the tension member of the top of the bolster opening, thus permitting clearance for the outer guide lugs 74 on the top portion of the bolster and also permitting the bottom of the bolster to clear the positioning studs 84 on the interlocking members.

It will be noted that by the method of interlocking the bolster with the side frame by means of the inserts I have just described, it is possible to raise the bolster end away from the springs and said inserts upon which it is normally seated and then to withdraw the bolster out of the side frame window opening, thus permitting a wheel change to be accomplished without disturbing the springs. The shoulders or flanges 74 at the extremity of the bolster end which serve to confine the inserts 36 on each side of the bolster have a vertical dimension indicated at B (Figure 7) less than the dimension A (Figure 1), already referred to between the tops of the inserts 36 and the compression member of the side frame when the parts are assembled. In removing the bolster end from the window opening of the side frame, therefore, it is necessary only to raise the bolster a sufficient amount to permit the shoulders or flanges 74 to clear the inserts 36. By this construction it will be noted I have devised a very practical arrangement for a quick wheel change truck of the spring plankless type.

It is to be understood that I do not wish to be limited by the exact embodiments of the invention shown which are merely by way of illustration and not limitation as various and other forms of the device will of course be apparent to those skilled in the art without departing from the spirit of the invention or the scope of the claims.

I claim:

1. In a four wheel railway truck, a truss side frame having a compression member, a tension member, and integral columns with centrally located guide flanges, a bolster having lateral walls, spaced interlocking members securing said bolster in relation to said side frame, each of said interlocking members having means engaging opposite sides of the adjacent bolster wall for cooperation therewith, said bolster having inner and outer lateral guide flanges on said walls in abutment with said interlocking members, and said interlocking members having centrally arranged vertical channels cooperating with said column guide flanges, said bolster having recesses in the bottom wall thereof for reception of the base portions of said members, said outer guide flanges having a vertical height less than the distance between the compression member of said side frame and the tops of said interlocking members.

2. In a four wheel truck, a truss side frame having a compression member, a tension member, and integral columns defining therewith a bolster opening, each of said columns having a vertical guide flange centrally located thereon both vertically and laterally thereof, spring means on said tension member in said opening, a bolster extending into said opening and seated on said spring means, and spaced interlocking members securing said bolster in said opening, said bolster having lateral walls with inner and outer vertical guide flanges and horizontal stop means cooperating with said interlocking members, said outer vertical flanges having a vertical height less than the distance between the tops of said interlocking members and said compression member, each of said interlocking members having spaced means embracing the adjacent bolster wall for cooperation therewith.

3. In a four wheel railway truck a side frame having a compression member, a tension member and integral columns defining a bolster opening, centrally located flanges on said columns, spaced interlocking means cooperating with said columns and comprising centrally located vertical channels cooperating with said column flanges, a bolster extending into said opening and having lateral walls with inner and outer guide flanges abutting said interlocking means, said outer flanges having a vertical height less than the distance between said compression member and the tops of said means, whereby said bolster may be released from cooperation with said means by vertical movement thereof and thereby removed from said openings, each of said interlocking means having spaced means embracing the adjacent lateral wall of said bolster for cooperation therewith.

4. In a railway truck, a cast steel truss side frame having U-shaped tension and compression members and spaced integral columns forming therewith spaced window openings, and an intervening bolster opening, said tension member having a horizontal portion beneath said bolster opening of box section with the top chord thereof widened and formed with upstanding flanges defining a spring seat portion, said spring seat portion having a top chord extending beneath said columns and into diagonal portions of said tension member to merge therewith between said columns and the end of said frame, said upstanding flanges converging adjacent their ends, each of said columns having a U section with the side walls thereof flaring adjacent their lower ends to merge with said converging flanges adjacent said columns, each of said columns having a vertical web extending from said compression member to said tension member and interrupted centrally thereof by a bolster guide portion, said guide portion comprising an arcuate wall interrupted centrally thereof by a vertical guide flange, all of said guide portion being spaced from the top of said bolster opening to afford entrance of an associated bolster end thereabove.

5. In a four wheel railway truck, a truss side frame having a compression member, a tension member, integral columns forming therewith a bolster opening, a spring group seated on said tension member in said opening, guide flanges centrally located on said columns both vertically and laterally thereof, a bolster extending into said opening and spaced interlocking means cooperating with said bolster and said column to retain said bolster in said opening, each of said interlocking means comprising an L-shaped member having an upstanding lug interlocked with the bottom chord of said bolster and spaced from the main body of said member to embrace therewith the adjacent lateral wall of said bolster, each of said interlocking means having a vertical channel cooperating with adjacent column guide flanges and lateral shoulders in abutment with guide flanges on said bolster, the top of said upstanding lug being disposed below said compression member a distance at least equal to the depth of the bolster extending into said opening, whereby said bolster may be assembled with said side frame while said interlocking means are supported in position on said spring group.

6. In a four wheel truck, a truss side frame having a compression member, a tension member, and integral columns defining therewith a bolster opening, each of said columns having a vertical guide flange centrally located thereon both vertically and laterally thereof, spring means on said tension member in said opening, a bolster extending into said opening and seated on said spring means, and interlocking members at each side thereof securing said bolster in said opening, said bolster having lateral walls with inner and outer vertical guide flanges cooperating with said interlocking members and horizontal stop means on the lateral edges of said bolster overlying and cooperating with said interlocking members, said outer guide flanges having a depth no greater than the vertical clearance between said compression member and said column guide flanges, whereby said outer guide flanges may be received in said clearance in assembling or dismantling said truck.

7. In a four wheel railway truck, a side frame having integral columns with vertical flanges, a bolster, and members interlocking said side frame and bolster, each of said members comprising a bottom wall with spaced upstanding means embracing the adjacent lateral wall of said bolster for cooperation therewith, one of said upstanding means comprising spaced vertical walls of cylindrical formation with an intervening channel cooperating with the adjacent flange of said side frame column, inner and outer vertical guide flanges on the lateral walls of said bolster in abutment with shoulders on one of said means, said outer guide flanges having a vertical height less than the distance between the tops of said members and the portion of said side frame vertically thereabove, whereby said bolster may be assembled with said side frame and said interlocking members while said interlocking members are in normal operative position.

8. In a four wheel railway truck, a side frame having a compression member, a tension member, and integral columns each having a vertical guide flange centrally located thereon both vertically and laterally thereof, a bolster end projecting into said opening, means at each side of said bolster end interlocking said side frame and bolster, said bolster having lateral walls with guide lugs abutting the lateral edges of said means both inwardly and outwardly thereof, said outer lugs having a vertical dimension less than the vertical distance between the tops of said means and the bottom of said compression member, each of said means comprising a bottom wall recessed in the bottom of said bolster end and upstanding portions embracing the adjacent lateral wall of said bolster end for cooperation therewith, one of said upstanding members comprising spaced diagonally arranged vertical walls with an intervening channel cooperating with the associated guide flange.

9. In a four wheel truck, a truss side frame having a compression member, a tension member, integral columns forming a bolster opening, each of said columns having spaced cylindrical surfaces and an intervening vertical guide flange centrally located thereon both vertically and laterally thereof, a bolster having an end projecting into said opening, and means at each side of said bolster interlocking said bolster with said side frame, said means having a plurality of upstanding members embracing the adjacent lateral wall of said bolster for cooperation therewith, said lateral wall having inner and outer guide flanges and horizontal stops overlying said means, said outer guide flanges having a length less than the vertical distance between said compression member and said means, whereby said bolster end may have vertical movement with respect to said means and release from said interlocking arrangement.

10. In a four wheel truck, a truss side frame having a compression member, a tension member, and integral columns forming a bolster opening, said columns having vertical guide flanges centrally located thereon both vertically and laterally thereof, a bolster end extending into said window opening, a plurality of means interlocking said bolster end with said columns respectively, said bolster having inner and outer lateral guide flanges on said lateral walls abutting each of said means respectively, and horizontal retaining flanges projecting above said means, each of said means being in the form of an L-shaped member with a bottom wall recessed in the bottom wall of said bolster end and upstanding portions for cooperation with the adjacent lateral wall of said bolster end, one of said upstanding portions comprising obliquely arranged vertical walls with an intervening channel cooperating with the adjacent guide flange.

11. In a four wheel truck, a side frame of truss type having a bolster opening and integral column guides with vertical guide flanges centrally located thereon both vertically and laterally thereof, a bolster projecting into said opening and spaced means interlocking said bolster with said side frame, said bolster having lateral walls with inboard and outboard flanges abutting said means, said outboard flanges having a relatively short length no greater than the clearance between the top member of said frame and said guide flanges, whereby said bolster may be disengaged from said interlocking means and removed from said opening, each of said means comprising a bottom wall seated beneath said bolster and an upstanding portion between said bolster and the adjacent column, said upstanding portion comprising a plurality of spaced diagonally arranged vertical walls cooperating with guide flanges on the adjacent column.

12. In a four wheel railway truck, a truss side frame having a compression member, a tension member, and integral columns with centrally located guide flanges, a bolster, spaced interlocking members securing said bolster in relation to said side frame, said bolster having lateral walls with inner and outer lateral guide flanges in abutment with said interlocking members, and each of said interlocking members comprising an upstanding portion with spaced obliquely arranged vertical walls defining an intervening channel cooperating with said column guide flanges and with guide surfaces inboard and outboard of said flanges, said bolster having recesses in the bottom wall thereof for reception of the base portions of said members, said outer guide flanges having a vertical height less than the distance between the tops of said interlocking members and said compression member, whereby said bolster may have vertical movement relative to said interlocking members and disengagement therefrom.

13. In a four wheel truck, a truss side frame having a compression member, a tension member, and integral columns forming a bolster opening, said columns having vertical guide flanges centrally located thereon both vertically and laterally thereof, a bolster end extending into said opening, and spaced means interlocking said bolster end with said columns respectively, said bolster end having lateral walls with inner and outer guide flanges abutting shoulders on said means respectively, certain of said guide flanges having a vertical height less than the distance between the tops of said interlocking means and said compression member, whereby said bolster may have vertical movement relative to said means and disengagement from said opening, each of said means having spaced upstanding members embracing the adjacent lateral wall of said bolster for cooperation therewith, and each of said interlocking means being in the form of an L-shaped member, one vertical portion of which comprises spaced diagonally arranged walls defining a vertical channel having cooperation with the guide flange on the adjacent column.

14. In a four wheel railway truck, a side frame having integral columns with guide flanges, spaced interlocking means having centrally arranged vertical channels cooperating with said flanges respectively, and a bolster cooperating with said interlocking means, each of said interlocking means having spaced members embracing the adjacent lateral wall of said bolster, said bolster having a bottom wall recessed to receive the bottom wall of said interlocking means and inner and outer guide flanges on said lateral walls having abutment with said interlocking means, said outer guide flanges having a vertical height less than the distance between the tops of said interlocking members and the portion of said side frame immediately there-overlying, whereby said bolster may have vertical movement relative to said means and disengagement from said side frame, each of said interlocking means having an L-shaped form with an upright portion comprising spaced diagonally arranged vertical walls defining said vertical channel.

15. In a railway truck, a truss type cast steel side frame having a compression member, a tension member, and spaced U-shaped columns forming therewith a bolster opening, said members having diagonal portions merging adjacent their ends with integrally formed journal boxes and forming with said columns spaced window openings, said tension member beneath said bolster opening having a box section, the top chord of which is widened and formed with upstanding flanges converging adjacent their ends and forming a spring seat, said top chord extending in bifurcated form beneath said columns into the diagonal portions of said tension members in gradually diminishing flanges which merge with the vertical walls of said diagonal portions of said tension member, each of said columns having a U-section with the side walls thereof flaring adjacent their lower ends to merge with said converging flanges adjacent said columns, each of said columns having a vertical web extending from said compression member to said tension member and interrupted centrally thereof by a bolster guide portion, said guide portion comprising an arcuate wall interrupted centrally thereof by a vertical guide flange, all of said guide portion being spaced from the top of said bolster opening to afford entrance of an associated bolster end thereabove.

16. In a railway truck, a cast steel truss side frame having U-shaped tension and compression members and spaced integral columns forming therewith spaced window openings and an intervening bolster opening, said tension member having a horizontal portion beneath said bolster opening of box section with the top chord thereof widened and formed with upstanding flanges defining a spring seat portion, said top chord extending beneath said columns and into diagonal portions of said tension member to merge therewith between said columns and the end of said frame, said upstanding flanges converging toward said columns adjacent their ends, each of said columns having a U-section with the side walls thereof flaring adjacent their lower ends to merge with said converging flanges adjacent said columns, each of said columns having a vertical web extending from said compression member to said tension member and interrupted centrally thereof by a bolster guide portion, said guide portion comprising a concave wall presenting centrally thereof a vertical guide flange, all of said guide portion being spaced from the top of said bolster opening to afford entrance of an associated bolster end thereabove.

17. In a railway truck, a cast steel truss side frame having U-shaped tension and compression members and spaced integral columns forming therewith spaced window openings and an intervening bolster opening, said tension member having a horizontal portion beneath said bolster opening of box section with the top chord thereof widened and formed with upstanding flanges defining a spring seat portion, said top chord extending beneath each of said columns in a bifurcated formation, opposite sides of which merge with the vertical walls of the diagonal portion of the tension member to form re-entrant flanges therewith, said upstanding flanges converging toward said columns adjacent their ends, each of said columns having a U-section with the side walls thereof flaring adjacent their lower ends to merge with said converging flanges, each of said columns having a vertical web extending from said compression member to said tension member and interrupted centrally thereof by a bolster guide portion, said guide portion comprising a concave wall presenting centrally thereof a vertical guide flange, all of said guide portion being spaced from the top of said bolster opening to afford entrance of an associated bolster end thereabove.

18. In a four wheel truck, a side frame of truss type having a bolster opening and integral column guides with vertical guide flanges centrally located thereon both vertically and laterally thereof, a bolster projecting into said opening and spaced means interlocking said bolster with said side frame, said bolster having lateral walls with inboard and outboard vertical shoulders affording stop means for said means, said outboard shoulders having a relatively short length no greater than the clearance between the top member of said frame and said guide flanges, whereby said bolster may be disengaged from said interlocking means and removed from said opening, each of said means comprising a bottom wall seated beneath said bolster and an upstanding portion between said bolster and the adjacent column, said upstanding portion comprising a plurality of spaced diagonally arranged vertical walls cooperating with guide flanges on the adjacent column.

ROBERT B. COTTRELL.